(12) United States Patent
Zhao et al.

(10) Patent No.: US 9,897,895 B2
(45) Date of Patent: Feb. 20, 2018

(54) METHOD FOR CONTROLLING A CAMERA MODULE, AND ASSOCIATED CAMERA MODULE

(71) Applicant: GALAXYCORE SHANGHAI LIMITED CORPORATION, Shanghai (CN)

(72) Inventors: Lixin Zhao, Shanghai (CN); Xinnan Hou, Shanghai (CN)

(73) Assignee: GALAXYCORE SHANGHAI LIMITED CORPORATION, Shanghai (CN)

( * ) Notice: Subject to any disclaimer, the term of this patent is extended or adjusted under 35 U.S.C. 154(b) by 89 days.

(21) Appl. No.: 14/911,844

(22) PCT Filed: Aug. 13, 2014

(86) PCT No.: PCT/CN2014/084254
§ 371 (c)(1),
(2) Date: Feb. 12, 2016

(87) PCT Pub. No.: WO2015/021916
PCT Pub. Date: Feb. 19, 2015

(65) Prior Publication Data
US 2016/0195794 A1    Jul. 7, 2016

(30) Foreign Application Priority Data

Aug. 13, 2013   (CN) .......................... 2013 1 0352412
Sep. 27, 2013   (CN) .......................... 2013 1 0451996

(51) Int. Cl.
*G03B 3/10*     (2006.01)
*H04N 5/225*    (2006.01)
(Continued)

(52) U.S. Cl.
CPC ................. *G03B 3/10* (2013.01); *G02B 7/08* (2013.01); *H04N 5/2254* (2013.01);
(Continued)

(58) Field of Classification Search
CPC ..................................................... G01B 11/026
See application file for complete search history.

(56) References Cited

U.S. PATENT DOCUMENTS 5,499,143 A     3/1996  Sakamoto et al.
8,068,167 B2 *  11/2011 Honda .................... F03G 7/065
                                                    348/357

(Continued)

FOREIGN PATENT DOCUMENTS

CN          1881068 A     12/2006
CN          101191889 A   6/2008
(Continued)

OTHER PUBLICATIONS

Chinese Patent Office Search Report, dated Sep. 27, 2013.
PCT International Search Report, dated Oct. 28, 2014.

*Primary Examiner* — Roberto Velez
*Assistant Examiner* — Cynthia Segura
(74) *Attorney, Agent, or Firm* — Dority & Manning, P.A.

(57) ABSTRACT

The present disclosure provides a control method for a camera module. The camera module comprises an imaging module, a sleeve module, a lens module which is mounted in the sleeve module and can move along an optical axis direction relative to the sleeve module, at least one coil, at least one magnetic component, and elastic components disposed between the lens module and the sleeve module. The method comprises: pressing the elastic components against the lens module, wherein a deformation of the elastic components perpendicular to the optical axis direction applies a radial positive pressure to the lens module, a frictional force in the optical axis direction is generated by (Continued)

the positive pressure on a contact surface of the elastic components and the lens module so that the frictional force can keep the lens module in a static state in the optical axis direction relative to the elastic components; and supplying current to the at least one coil, wherein the at least one coil or the at least one magnetic component optionally matches the lens module, and the lens module is subject to an electromagnetic force in the optical axis direction, the electromagnetic force acting as a driving force for the lens module to do rectilinear motion along the optical axis direction so as to drive the lens module to move.

44 Claims, 5 Drawing Sheets

(51) Int. Cl.
*H04N 5/232* (2006.01)
*G02B 7/08* (2006.01)

(52) U.S. Cl.
CPC ....... *H04N 5/2257* (2013.01); *H04N 5/23212* (2013.01); *H04N 5/23241* (2013.01); *G03B 2205/0069* (2013.01)

(56) References Cited

U.S. PATENT DOCUMENTS

| | | | |
|---|---|---|---|
| 8,319,886 B1* | 11/2012 | Wang | G02B 7/08 348/202 |
| 2009/0109816 A1* | 4/2009 | Usui | G11B 7/1267 369/47.53 |
| 2010/0208369 A1* | 8/2010 | Shin | G02B 7/023 359/811 |
| 2011/0002681 A1* | 1/2011 | Yamashita | G02B 7/102 396/133 |
| 2012/0014002 A1* | 1/2012 | Ollila | G02B 7/08 359/824 |
| 2012/0069238 A1* | 3/2012 | Toyomura | H04N 5/23232 348/340 |
| 2012/0200230 A1* | 8/2012 | Esaki | H05B 33/0851 315/200 R |

FOREIGN PATENT DOCUMENTS

| | | |
|---|---|---|
| CN | 101398526 A | 4/2009 |
| CN | 101520538 A | 9/2009 |
| CN | 102437706 A | 5/2012 |
| CN | 103176260 A | 6/2013 |
| CN | 203054321 U | 7/2013 |
| JP | H07239437 A | 9/1995 |

* cited by examiner

METHOD FOR CONTROLLING A CAMERA MODULE, AND ASSOCIATED CAMERA MODULE

TECHNICAL FIELD

The present disclosure relates to a miniature camera module which can control a movement direction and a movement distance of the lens cone to implement the stretching and/or focusing function of the lens cone.

BACKGROUND OF THE INVENTION

The camera module consists of a light-sensitive chip and an imaging lens group, wherein the imaging lens group is disposed in the lens cone of the module and only an active coordination of positions of the lens cone and the light-sensitive chip can obtain a high-quality image or video. As for the modern handheld device, on one hand, it is designed to be thinner and thinner for aesthetic needs, and the height of the camera module becomes lower and lower, and correspondingly the total height of the lens group is reduced; on the other hand, in order to meet the demand of image quality, diagonal dimension of the light-sensitive surface of the light-sensitive chip is growing. Therefore, it is always a problem in the handheld device design industry how to ensure keeping the viewing angle of the lens group constant, increasing the light-sensitive chip size, and meeting the appearance design requirement of the handheld device of a thinner body. The digital camera, especially the ultra-thin digital camera employs a stretchable lens group to solve this problem, for example, a mechanical transmission structure such as a thread/nut structure, a gear structure, or a turbine vortex stem, but such a structure is relatively large and cannot be placed in a thinner device such as a mobile phone, a laptop, a Pad, etc. Regarding the voice coil motor commonly used in the existing thin and light devices, its lens cone cannot stretch out the camera module, and can only be used for automatic focusing; since it cannot realize the stretching function of the lens group at work, it cannot solve the problem caused by the height of the camera module becoming lower and lower. In addition, as for the existing camera module, in order to keep the lens cone in a certain position, it is necessary to continuously apply current to the coil to balance the elasticity of an elastomer, and thus the power consumption of the module is relatively large, and when the lens cone makes linear motions along the optical axis direction, since the optical axis direction lacks a guide structure, it is easy to shake and cause eccentricity of the optical path, thereby affecting the image quality.

Apparently, a thin and light electronic device needs a new kind of miniature camera module to solve the above contradiction between thickness and image quality of the existing module, and solve the problems in the existing module. Such a new kind of camera module can stretch the lens cone out of the module and ensure increasing the size of the light-sensitive chip on the condition of a constant viewing angle to improve the image quality, and meanwhile it is required that the structure is simple and can be applied to the thin and light electronic device such as a mobile phone, a pad, etc.

SUMMARY OF THE INVENTION

In view of the understanding of the technical problem in the background art, it will be very beneficial if a new kind of camera module suitable for a thin and light consumer electronic product and a corresponding control method for such a kind of camera module may be provided.

The first aspect of the present disclosure provides a control method for a camera module, wherein the camera module comprises an imaging module, a sleeve module, a lens module which is mounted in the sleeve module and can move along an optical axis direction relative to the sleeve module, at least one coil, at least one magnetic component, and elastic components disposed between the lens module and the sleeve module, the control method comprising steps of:

a1. pressing the elastic components against the lens module, wherein deformation of the elastic components perpendicular to the optical axis direction applies a radial positive pressure to the lens module, a frictional force in the optical axis direction is generated by the positive pressure on a contact surface of the elastic components and the lens module so that the frictional force can keep the lens module in a static state in the optical axis direction relative to the elastic components, or a2. fixedly connecting the elastic components to the lens module, wherein the elastic components are pressed against an electric conductor disposed between the lens module and the sleeve module, the electric conductor and the sleeve module are static relative to each other and fixed with each other directly or indirectly; a deformation of the elastic components perpendicular to the optical axis direction applies a radial positive pressure to the electric conductor for the lens module and the elastic components integrally, a frictional force in the optical axis direction is generated by the positive pressure on the contact surface of the electric conductor and the elastic components so that the frictional force can keep the lens module and the elastic components integrally in the static state in the optical axis direction relative to the sleeve module; and b. supplying current to the at least one coil, wherein the at least one coil or the at least one magnetic component optionally matches the lens module, and the lens module is subject to an electromagnetic force in the optical axis direction, the electromagnetic force acting as a driving force for the lens module to do rectilinear motion along the optical axis direction so as to drive the lens module to move.

Preferably, in one embodiment according to the present disclosure, the current supplied to the at least one coil is pulse current so that the lens module implements a non-continuous movement;

a ratio of absolute values of a maximum value and a minimum value of the pulse current is at least 1.2; and a single pulse width of the pulse current is less than 2 s, i.e. the time for each continuous movement of the lens module is less than 2 s.

In one embodiment according to the present disclosure, in the step b, an initial current is supplied to the at least one coil so that the at least one coil and the at least one magnetic component are static relative to each other, and a value of a voltage divided by the current in the at least one coil keeps a first relationship, i.e. $U/I=R$.

In one embodiment according to the present disclosure, the method further comprising: gradually increasing the initial current to cause a relative movement between the at least one coil and the at least one magnetic component, which results in the value of the voltage divided by the current in the at least one coil to be a second relationship, i.e. $U/I>R$; and detecting a change in the first relationship of the value of a voltage divided by the current in the at least one coil to determine that the relative movement occurs between the at least one coil and the at least one magnetic component and to obtain a critical current value that causes a relative movement between the at least one coil and the at least one magnetic component.

In one embodiment according to the present disclosure, in the step b, the movement of the lens module is a relative forward or reverse movement along the optical axis direction relative to the elastic components, wherein each of the relative forward or reverse movement is of a first movement distance that is determined by the radial positive pressure of the elastic components, magnitude, rise rate and waveform width of the pulse current in the at least one coil, and a friction coefficient between the lens module and the elastic components; and changing one or more of above parameters can change the first movement distance to control the movement of the lens module.

In one embodiment according to the present disclosure, in the step b, the movement of the lens module is a relative forward or reverse movement along the optical axis direction relative to the sleeve module, wherein each of the relative forward or reverse movement is of a first movement distance that is determined by the radial positive pressure of the elastic components, magnitude, rise rate and waveform width of the pulse current in the at least one coil, and a friction coefficient between the electric conductor and the elastic components; and changing one or more of above parameters can change the first movement distance to control the movement of the lens module and the elastic components.

In one embodiment according to the present disclosure, the lens module further includes a motion carrier seat, a lens cone and a friction component, wherein the lens cone is disposed in the motion carrier seat, and the motion carrier seat and the lens cone are integral; the motion carrier seat has several extension parts that are radially divergent; the at least one coil is disposed in the extension parts and is adapted to move together with the lens module; and the friction component is disposed between the extension parts and the elastic components.

In one embodiment according to the present disclosure, the lens module further includes a motion carrier seat, a lens cone and a friction component, wherein the lens cone is disposed in the motion carrier seat, and the motion carrier seat and the lens cone can be integral; an external surface of the motion carrier seat is provided with the magnetic component and is adapted to move together with the lens module; the at least one coil is disposed at a position of the sleeve module corresponding to the magnetic component; the elastic components are disposed at positions inside the sleeve module that is not corresponding to the at least one magnetic component; and the friction component is disposed between the motion carrier seat and the at least one elastic component.

In one embodiment according to the present disclosure, the lens module further includes a motion carrier seat and a lens cone, wherein the lens cone is disposed in the motion carrier seat, and the motion carrier seat and the lens cone are integrally or separately modeled; the motion carrier seat has several extension parts that are radially divergent; the at least one coil is disposed in the extension parts and is adapted to move together with the lens module; and the elastic components are connected to the extension parts or external of the coil so that the elastic components can move together with the lens module.

In one embodiment according to the present disclosure, the electric conductor is in contact with a power supply terminal, and the elastic components are conductive or each has a conductive part; and the at least one coil is in contact with and connected to the elastic components so that the power supply terminal can provide current to the at least one coil through the electric conductor and then through the elastic components.

In one embodiment according to the present disclosure, the lens module can have two structure states in the step a, wherein in a first state, the lens module is initially in a state of focusing on an object at infinity for directly imaging; and in a second state, the lens module is initially in a state of not focusing on an object at infinity for directly imaging; the lens module is adjusted to the state of focusing on the object at infinity for imaging by supplying current through the coil, and stretching the lens module out of the sleeve module.

In addition, the second aspect of the present disclosure provides a camera module comprising an imaging module, a sleeve module, a lens module which is mounted in the sleeve module and can move along an optical axis direction relative to the sleeve module, at least one coil, at least one magnetic component, and elastic components disposed between the lens module and the sleeve module, characterized in that:

the elastic components are pressed against the lens module, wherein deformation of the elastic components perpendicular to the optical axis direction applies a radial positive pressure to the lens module, a frictional force in the optical axis direction is generated by the positive pressure on a contact surface of the elastic components and the lens module so that the frictional force can keep the lens module in a static state in the optical axis direction relative to the elastic components, or the elastic components are fixedly connected to the lens module, wherein the elastic components are pressed against an electric conductor; the electric conductor and the sleeve module are static relative to each other and fixed with each other directly or indirectly; a deformation of the elastic components perpendicular to the optical axis direction applies a radial positive pressure to the electric conductor; a frictional force in the optical axis direction is generated by the positive pressure on the contact surface of the elastic components and the electric conductor so that the frictional force can keep the lens module and the elastic components integrally in the static state in the optical axis direction relative to the sleeve module; and the camera module further comprises a power supply control device which supplies current for the at least one coil, wherein the at least one coil or the at least one magnetic component optionally matches the lens module, and the lens module is subject to an electromagnetic force in the optical axis direction, the electromagnetic force acting as a driving force for the lens module to do rectilinear motion along the optical axis direction so as to drive the lens module to move.

In one embodiment according to the present disclosure, the current supplied by the power supply control device to the at least one coil is pulse current so that the lens module implements a non-continuous movement;

a ratio of absolute values of a maximum value and a minimum value of the pulse current is at least 1.2; and a single pulse width of the pulse current is less than 2 s.

In one embodiment according to the present disclosure, the movement of the lens module is a relative forward or reverse movement along the optical axis direction relative to the elastic components, wherein each of the relative forward or reverse movement is of a first movement distance that is determined by the radial positive pressure of the elastic components, magnitude, rise rate and waveform width of the pulse current in the at least one coil, and a friction coefficient between the lens module and the elastic components; and changing one or more of above parameters can change the first movement distance to control the movement of the lens module.

In one embodiment according to the present disclosure, the movement of the lens module is a relative forward or reverse movement along the optical axis direction relative to the sleeve module integrally with the elastic components, wherein each of the relative forward or reverse movement is of a first movement distance that is determined by the radial positive pressure of the elastic components, magnitude, rise rate and waveform width of the pulse current in the at least one coil, and a friction coefficient between the electric conductor and the elastic components; and changing one or more of above parameters can change the first movement distance to control the movement of the lens module.

In one embodiment according to the present disclosure, the lens module further includes a motion carrier seat, a lens cone and a friction component, wherein the lens cone is disposed in the motion carrier seat, and the motion carrier seat and the lens cone can be integral; the motion carrier seat has several extension parts that are radially divergent; the at least one coil is disposed in the extension parts and is adapted to move together with the lens module; and the friction component is disposed between the extension parts and the elastic components.

In one embodiment according to the present disclosure, the lens module further includes a motion carrier seat and a lens cone, wherein the lens cone is disposed in the motion carrier seat, and the motion carrier seat and the lens cone are integrally or separately modeled; the motion carrier seat has several extension parts that are radially divergent; the at least one coil is disposed in the extension parts and is adapted to move together with the lens module; and the elastic components are connected to the extension parts or external of the coil so that the elastic components can move together with the lens module.

In one embodiment according to the present disclosure, the lens module further includes a motion carrier seat, a lens cone and a friction component, wherein the lens cone is disposed in the motion carrier seat, and the motion carrier seat and the lens cone can be integral; external surface of the motion carrier seat is provided with the magnetic component and is adapted to move together with the lens module; the at least one coil is disposed at a position of the sleeve module corresponding to the magnetic component; the elastic components are disposed at positions inside the sleeve module that is not corresponding to the at least one magnetic component; and the friction component is disposed between the motion carrier seat and the at least one elastic component.

In one embodiment according to the present disclosure, the electric conductor is in contact with a power supply terminal, and the elastic components are conductive or each has a conductive part; and the at least one coil is in contact with and connected to the elastic components so that the power supply terminal can provide current to the at least one coil through the electric conductor and then through the elastic components.

In one embodiment according to the present disclosure, the lens module may have two structure states in the step a, wherein in a first state, the lens module is initially in a state of focusing on an object at infinity for directly imaging; and in a second state, the lens module is initially in a state of not focusing on an object at infinity for directly imaging; the lens module is adjusted to the state of focusing on the object at infinity for imaging by supplying current through the coil, and stretching the lens module out of the sleeve module.

By means of the control method and the camera module according to the present disclosure, optimal control of the camera module can be achieved so that such a new kind of camera module can enable the lens cone stretch out of the module, and increases the size of the light-sensitive chip on the condition of ensuring a constant viewing angle to improve the image quality. Meanwhile, its structure is simple and can be applied to the thin and light electronic device such as a mobile phone, a pad, etc. Besides, no additional current is needed when the lens cone is static, thereby saving the power consumption of the camera module, which is especially important for a portable device.

DESCRIPTION OF PREFERRED EMBODIMENTS

Specific embodiments of the present disclosure will be described below in detail with reference to FIGS. 1-10.

Figure 1:
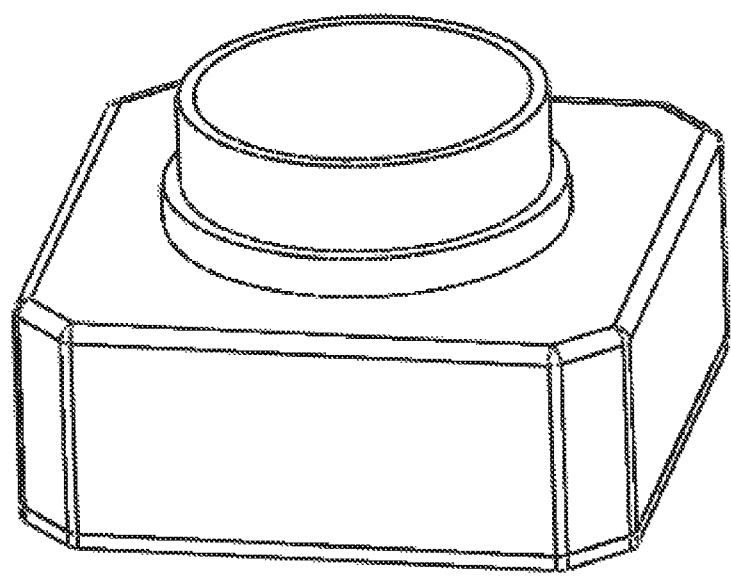
FIG. 1 is a perspective diagram of the appearance of the camera module according to the present disclosure.

FIG. 1 is a perspective diagram of the appearance of the camera module according to the present disclosure. It can be seen from FIG. 1 that a lens module at the center can stretch out of the whole module and can be in three states, i.e. not stretching, stretching out a portion, and stretching out to the farthest end.

First Embodiment

Figure 2:
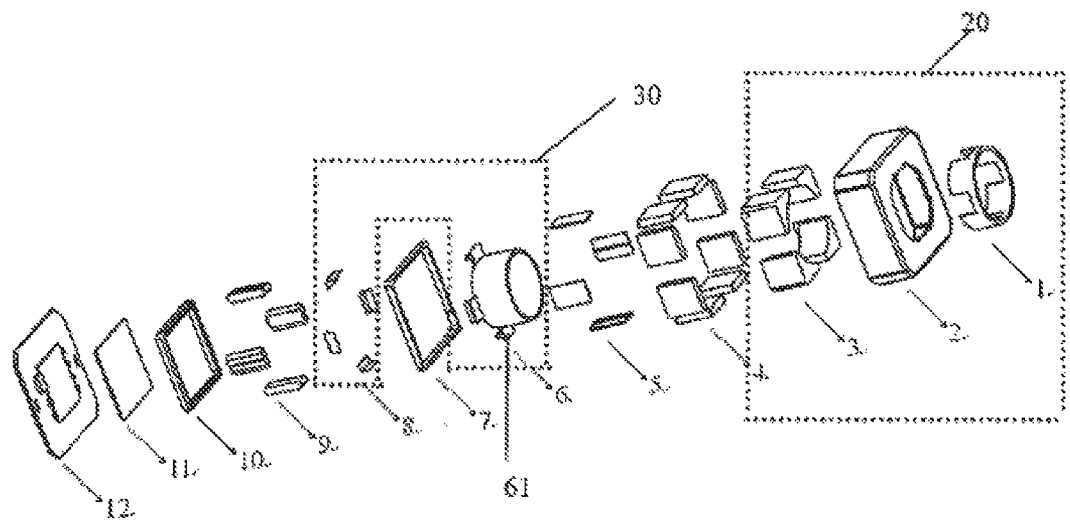
FIG. 2 is a schematic diagram of the structure decomposition of the camera module according to the first embodiment of the present disclosure.
Figure 3:
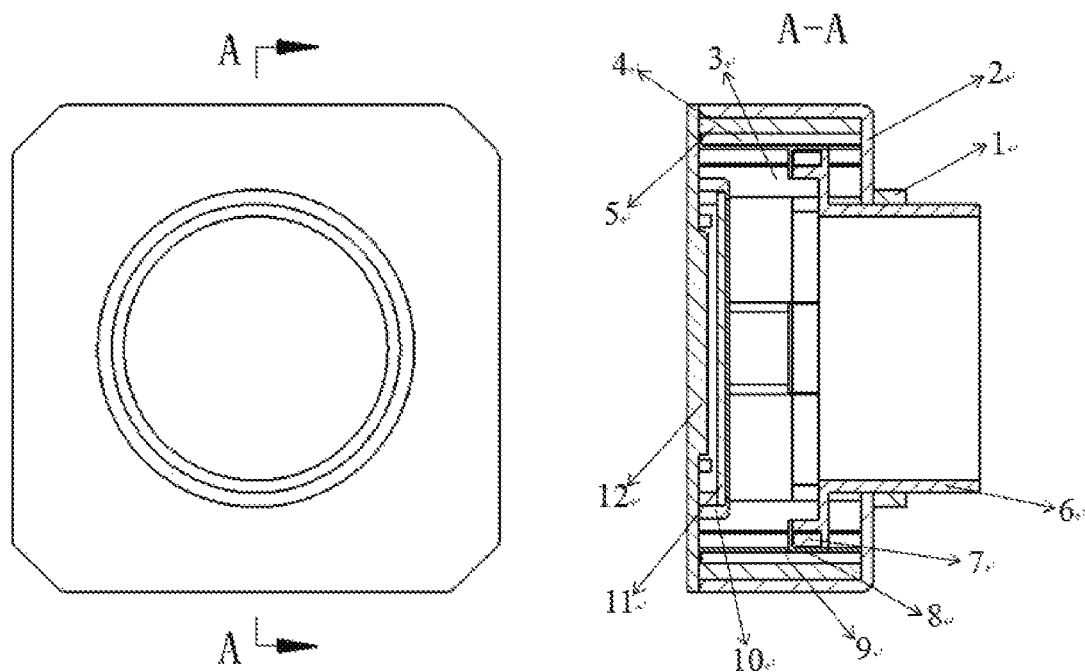
FIG. 3 is a side sectional view of the camera module according to the first embodiment of the present disclosure along an optical axis direction.

FIG. 2 is a schematic diagram of the structure decomposition of the camera module according to the first embodiment of the present disclosure. FIG. 3 is a side sectional view of the camera module according to the first embodiment of the present disclosure along an optical axis direction.

It can be seen from the figures that the camera module according to the present disclosure comprises: an imaging module 12, a sleeve module 20, a lens module 30 which is disposed in the sleeve module 20 and can move along an optical axis direction relative to the sleeve module 20, at least one coil 7 (one coil in this embodiment), at least one magnetic component 4 (eight magnetic components that can be combined into a circle in this embodiment), and elastic components 9 disposed between the lens module 30 and the sleeve module 20, wherein in order that in a static state, no current is required to maintain the static state so as to reduce the power consumption of the whole camera module, in the camera module according to the present disclosure, the elastic components 9 are pressed against the lens module 30 such that deformation of the elastic components 9 perpendicular to the optical axis direction applies a radial positive pressure to the lens module 30 and the elastic components 9 generate a frictional force in the optical axis direction on a contact surface of the elastic components 9 and the lens module 30 through the positive pressure, and the frictional force can keep the lens module 30 in a static state in the optical axis direction relative to the elastic components 9.

Figure 8:
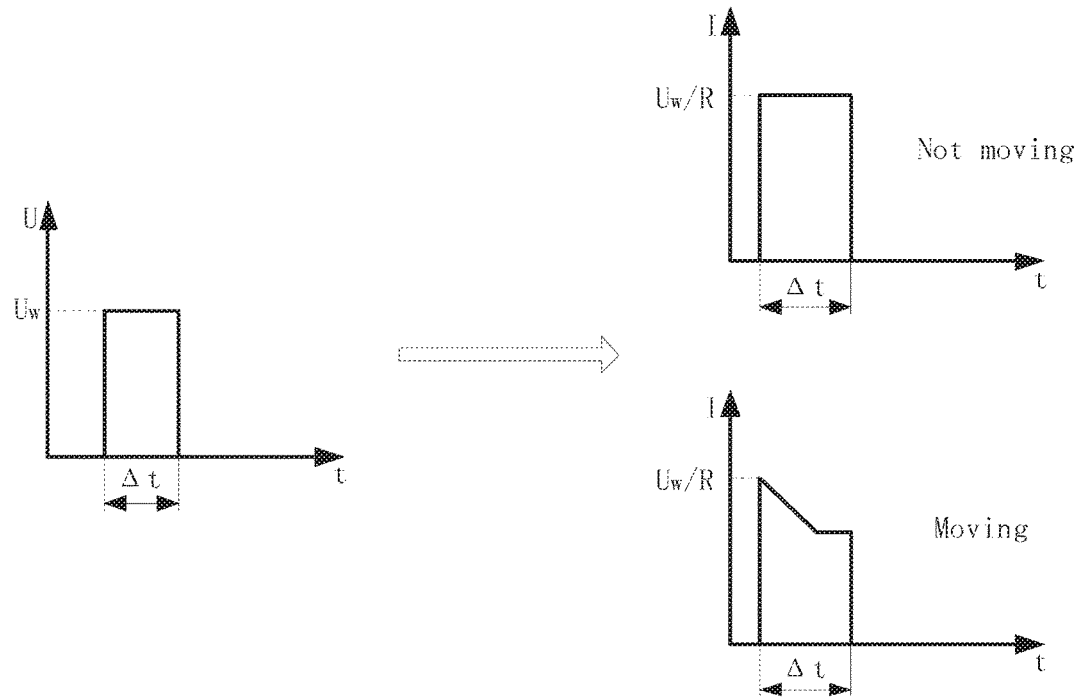
FIG. 8 is a schematic diagram of voltage and current signals driven by a voltage source according to the present disclosure.

In this embodiment, a power supply device provides current to the camera module, and it is controlled by a power supply control device (as shown in FIG. 8) of the imaging module to provide current to the coil 7. The coil 7 matches the lens module 30, and the lens module 30 is subject to an electromagnetic force in the optical axis direction. The electromagnetic force acts as a driving force for the lens module 30 to make rectilinear motions along the optical axis direction so as to drive the lens module 30 to move.

Figure 9:
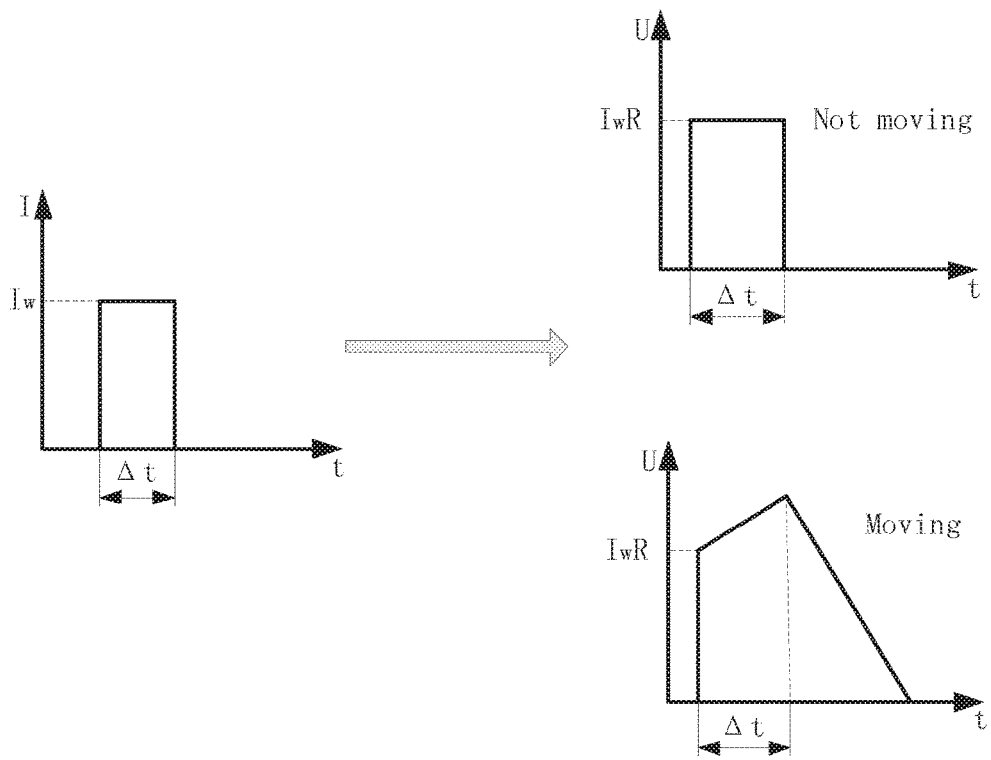
FIG. 9 is a schematic diagram of current and voltage signals driven by a current source according to the present disclosure.
Figure 10:
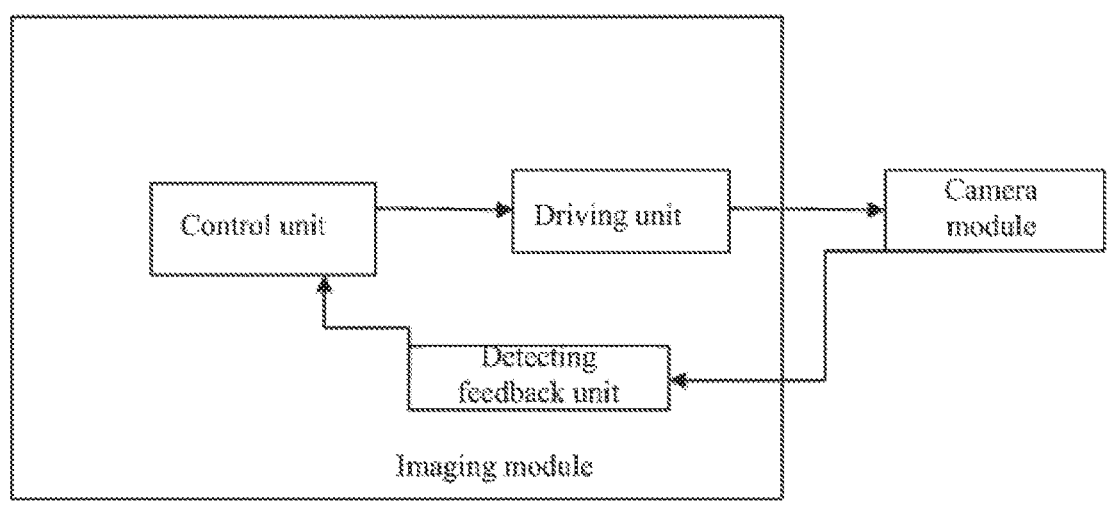
FIG. 10 is a flowchart of a method for controlling a lens cone of a camera module to make a single-step movement according to the present disclosure.

Referring to FIG. 2, FIG. 3, FIG. 8, FIG. 9 and FIG. 10 at the same time, FIG. 8 is a schematic diagram of voltage and current signals driven by a voltage source according to the present disclosure; FIG. 9 is a schematic diagram of current and voltage signals driven by a current source according to the present disclosure; and FIG. 10 is a flowchart of a method for controlling the lens cone of the camera module to make a single-step movement according to the present disclosure. Specifically, a driving unit (unlabeled) supplies pulse current to the coil 7 under the control of the power supply control device (unlabeled) so that the lens module 30 implements a non-continuous movement. A ratio of absolute values of the maximum value and the minimum value of the pulse current is at least 1.2, and 2 is employed in this embodiment. A single pulse width of the pulse current is less than 2 s, and it is is in this embodiment. At a first timing, the driving unit supplies an initial current to the coil 7 under the control of the power supply control device so that the coil 7 and the magnetic components 4 are relatively static to each other, and through detection of a detecting feedback unit (unlabeled), a value of the voltage divided by the current in the coil 7 keeps a first relationship, i.e. U/I=R. Next, the initial current is gradually increased to cause a relative movement between the coil 7 and the magnetic components 4, which results in a second relationship of the value of the voltage divided by the current in the coil 7, i.e. U/I>R. By detecting a change in the first relationship of the value of the voltage divided by the current in the coil 7, the detecting feedback unit can determine that a relative movement occurs between the coil 7 and the magnetic components 4 and obtain a critical current value that causes the relative movement between the coil 7 and the magnetic components 4. Herein, the movement of the lens module 30 is a relative forward or reverse movement along the optical axis direction relative to the elastic components, and each of the relative forward or reverse movement has a first movement distance that is determined by the radial positive pressure of the elastic components 9, magnitude, rise rate and waveform width of the pulse current in the coil 7, and a friction coefficient between the lens module 30 and the elastic components 9. The first movement distance may be specifically determined by the following distance formula of a single-step movement $$s = \frac{nBLI_w(nBLI_w - f + mg\cos\theta)}{2m(f - mg\cos\theta)}\Delta t^2$$

where n is the number of turns of the coil, B is the magnetic induction intensity, L is the effective length of one-turn of the coil, m is the quality of the moving component, f is the magnitude of the friction, $I_w$ is the driving current, $\theta$ is an angle between the movement direction and gravity of the lens cone, and $\Delta t$ is pulse width of a square wave.

Changing one or more of the above parameters can change the first movement distance to control the movement of the lens module 30.

As shown in FIG. 2 and FIG. 3, the lens module 30 further includes a motion carrier seat 6, a lens cone (located within the motion carrier seat, unlabeled) and a friction component 8.

The lens cone is disposed within the motion carrier seat 6, and the motion carrier seat 6 and the lens cone may be integrally or separately modeled. The motion carrier seat 6 is provided with several extension parts 61 that are radially divergent; the coil 7 is disposed in the extension parts 61 and is adapted to move together with the lens module 30; the friction component 8 is disposed between the extension parts 61 and the elastic components 9. In addition, the sleeve module 20 further includes a magnetic yoke ring 2 and a sleeve unit 1 disposed within the magnetic yoke ring 2, and the sleeve unit 20 stretches out of an outer end surface of the magnetic yoke ring 2 for more than 0.2 mm, which functions to guide the lens module 30 and protect the lens module 30. Moreover, yoke iron blocks 3 may be disposed in the magnetic yoke ring 2, and the yoke iron blocks 3 are of magnetic conductive material and function to conduct magnetism for the magnetic components 4; an air gap is between the yoke iron blocks 3 and an internal surface of the magnetic yoke ring 2; the coil 7 is disposed in the air gap and can move along the optical axis direction, and length of the air gap in the optical axis direction occupies more than one third of the total thickness of the camera module in the optical axis direction. Herein, the magnetic yoke ring 2, the sleeve unit 1 and the yoke iron blocks 3 of the sleeve module 20 are integrally or separately modeled.

The coil 7 is connected to a first conductive part (unlabeled) of the lens module 30; the conductive part is in contact with the elastic components 9; the elastic components 9 are in contact with a power supply terminal and are adapted to be powered by the power supply device; and the elastic components 9 are conductive or each has a second conductive part so that the power supply terminal can provide current to the coil 7 through the elastic components 9 or the second conductive part of the elastic component 9. The coil 7 includes two fixed structures. In a first fixed structure, the coil 7 is directly and fixedly connected to the extension parts 61. In a second fixed structure, the coil 7 is at a relative movement distance from the extension parts 61 in the optical axis direction, and the relative movement distance is between 10 μm and 1 mm. The power supply control device transmits a control signal to the driving unit to further provide a driving signal corresponding to the coil 7 of the camera module.

In the first fixed structure, there are two driving modes for the current. In a first driving mode, current in consistent with the relative forward direction is supplied to the coil 7 to directly drive the lens module 30 to move; and in a second driving mode, current in consistent with the relative reverse direction is supplied to the coil 7 so that the lens module 30 stores certain elastic potential energy, and then current in consistent with the relative forward direction is supplied to drive the lens module 30 to move and to rest under the friction force.

In the second fixed structure, the driving mode of the current is: supplying current in consistent with the relative reverse direction to the coil 7 so that the coil 7 stores certain elastic potential energy, and then supplying current in consistent with the relative forward direction so that the electromagnetic force does positive work and the coil 7 accumulates kinetic energy and collides with the lens module 30 to drive the lens module 30 to move and to rest under the friction force. In addition, the camera module is further provided with a base 10. The base 10 is disposed on the imaging module 12 to limit the moving positions of the lens module 30 along the optical axis direction. The camera module may further include an infrared filter that is laid on the photosensitive surface of the image sensor of the imaging module 12.

Second Embodiment

Figure 4:
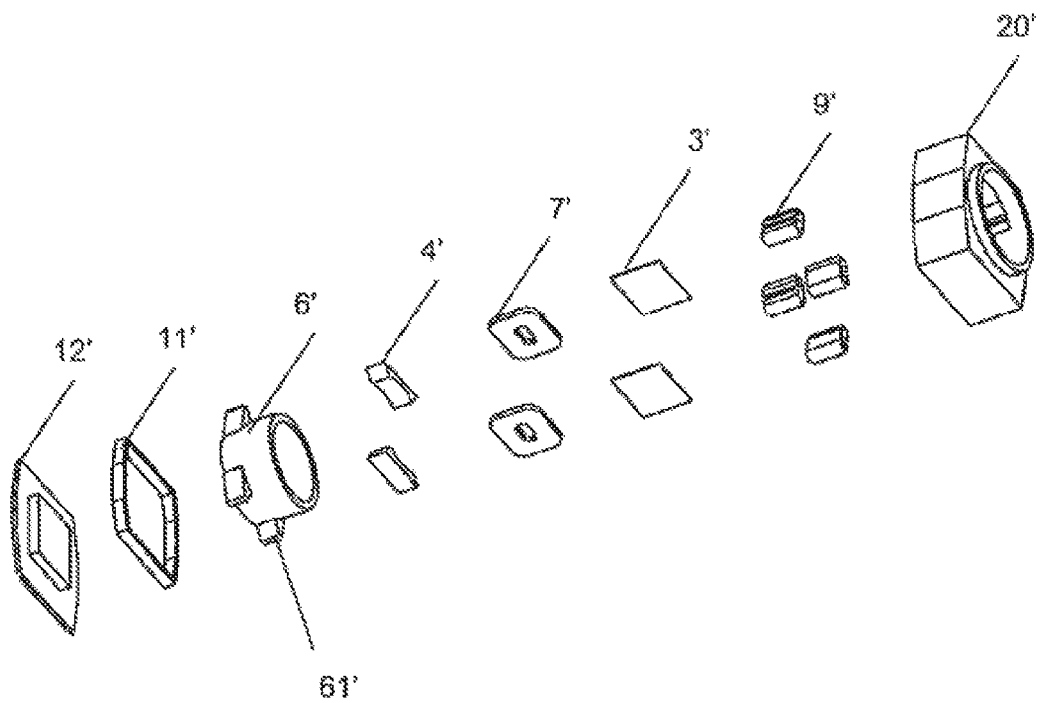
FIG. 4 is a schematic diagram of the structure decomposition of the camera module according to the second embodiment of the present disclosure.
Figure 5:
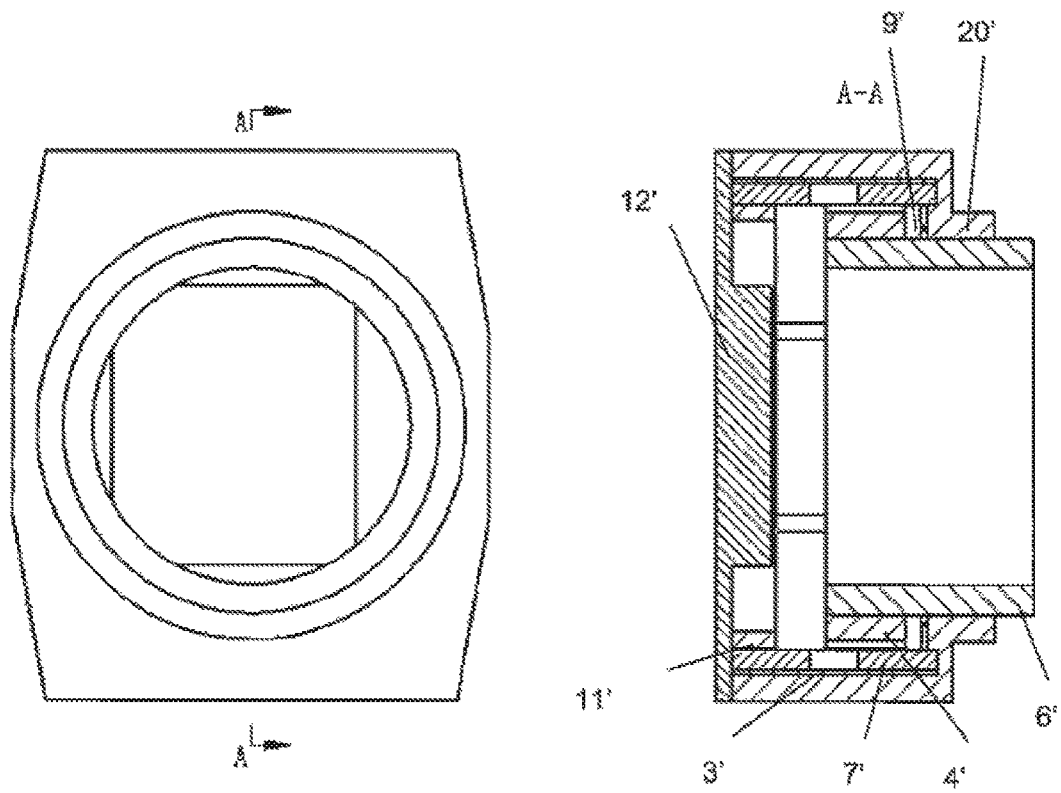
FIG. 5 is a side sectional view of the camera module according to the second embodiment of the present disclosure along an optical axis direction.

Referring to FIG. 4, FIG. 5, FIG. 8, FIG. 9 and FIG. 10 at the same time. FIG. 4 is a schematic diagram of the structure decomposition of the camera module according to the second embodiment of the present disclosure, and FIG. 5 is a side sectional view of the camera module according to the second embodiment of the present disclosure along an optical axis direction.

A driving unit supplies pulse current to the coils 7' under the control of the power supply control device so that the lens module 30' implements a non-continuous movement. A ratio of absolute values of the maximum value and the minimum value of the pulse current is at least 1.2, and 2 is employed in this embodiment. A single pulse width of the pulse current is less than 2 s, and it is is in this embodiment. At a first timing, the driving unit supplies an initial current to the coils 7' under the control of the power supply control device so that the coils 7' and the magnetic components 4' are relatively static to each other, and through detection of a detecting feedback unit, a value of the voltage divided by the current in the coils 7' keeps a first relationship, i.e. U/I=R. Next, the initial current is gradually increased to cause a relative movement between the coils 7' and the magnetic components 4', which results in a second relationship of the value of the voltage divided by the current in the coils 7', i.e. U/I>R. By detecting a change in the first relationship of the value of the voltage divided by the current in the coils 7', the detecting feedback unit can determine that a relative movement occurs between the coils 7' and the magnetic components 4' and obtain a critical current value that causes the relative movement between the coils 7' and the magnetic components 4'. Herein, the movement of the lens module 30' is a relative forward or reverse movement along the optical axis direction relative to the elastic components 9', and each of the relative forward or reverse movement has a first movement distance that is determined by the radial positive pressure of the elastic components 9', magnitude, rise rate and waveform width of the pulse current in the coils 7', and a friction coefficient between the lens module 30' and the elastic components 9'. The first movement distance may be specifically determined by the following distance formula of a single-step movement single-step movement distance formula $$s = \frac{nBLI_w(nBLI_w - f + mg\cos\theta)}{2m(f - mg\cos\theta)} \Delta t^2$$

where n is the effective number of turns of the coil that cut the magnetic lines of flux, B is the magnetic induction intensity, L is the effective length of one-turn of the coil, m is the quality of the moving component, f is the magnitude of the friction, $I_w$ is the driving current, θ is an angle between the movement direction and gravity of the lens cone, and Δt is pulse width of a square wave.

Changing one or more of the above parameters can change the first movement distance to control the movement of the lens module 30'.

Referring to FIG. 4 and FIG. 5, in the second embodiment of the present disclosure, the lens module 30' further includes a motion carrier seat 6', a lens cone (unlabeled) and a friction component (unlabeled).

The lens cone is disposed within the motion carrier seat 6', and the motion carrier seat 6' and the lens cone may be moved integrally. The motion carrier seat 6' is provided with several extension parts 61' that stretch outward and are disposed at interval; the external surface of the motion carrier seat 6' is provided with magnetic components 4', and the magnetic components 4' are disposed between the extension parts 61' and is adapted to move together with the lens module 30'; the coils 7' are disposed at positions where the sleeve module 20' corresponds to the magnetic components 4'; the elastic components 9' are disposed between the sleeve module 20' and the lens module 30'; the friction component 8 is disposed between the extension parts 61 and the elastic components 9. The camera module further comprises a base 10' which is disposed on the imaging module 12' to limit the moving positions of the lens module 30' along the optical axis direction. The coils 7' are directly in contact with a power supply terminal, and the supply terminal provides current to the coils 7'. Each magnetic component 4' includes two fixed structures. In a first fixed structure, the magnetic component 4' is directly and fixedly connected to the extension parts 61' on the motion carrier seat 6'. In a second fixed structure, the magnetic component 4' is at a relative movement distance from the motion carrier seat 6' in the optical axis direction, and the relative movement distance is between 10 μm and 1 mm. The control of the power supply control device transmits a control signal to the driving unit to further provide a driving signal corresponding to the coils 7' of the camera module. In the first fixed structure of the second embodiment, there are two driving modes for the current.

In a first driving mode, current in consistent with the relative forward direction is supplied to the coils 7' so that the magnetic components 4' directly drive the lens module 30' to move; and In a second driving mode, current in consistent with the relative reverse direction is supplied to the coils 7' so that the lens module 30' stores certain elastic potential energy, and then current in consistent with the relative forward direction is supplied so that the magnetic components 4' drive the lens module 30' to move and to rest under the friction force. In the second fixed structure, the driving mode for the current is: firstly supplying current in consistent with the relative reverse direction to the coils 7' so that the magnetic components 4' store certain elastic potential energy, and then supplying current in consistent with the relative forward direction so that the electromagnetic force does positive work and the magnetic components 4' accumulate kinetic energy and collides with the lens module 30' to drive the lens module 30' to move and to rest under the friction force.

Third Embodiment

Figure 6:
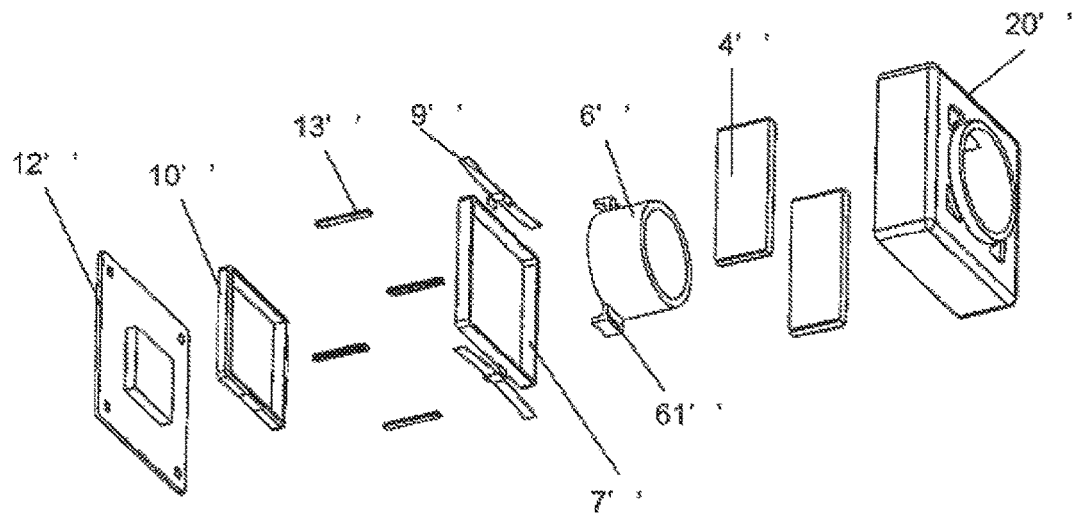
FIG. 6 is a schematic diagram of the structure decomposition of the camera module according to the third embodiment of the present disclosure.
Figure 7:
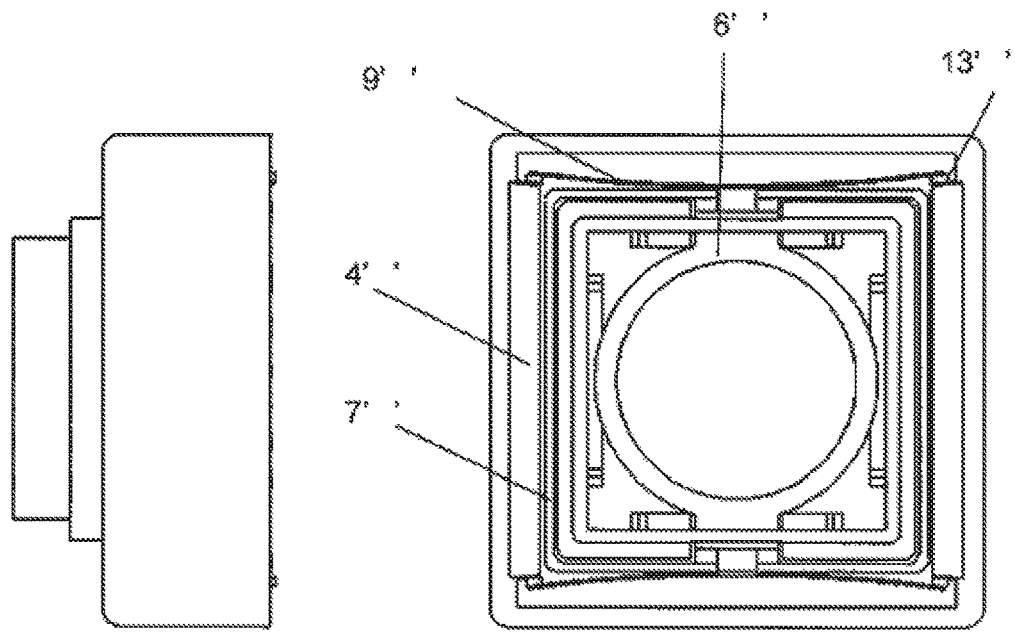
FIG. 7 is a top view of the camera module according to the third embodiment of the present disclosure along an optical axis direction.

Referring to FIG. 6 and FIG. 7, FIG. 6 is a schematic diagram of the structure decomposition of the camera module according to the third embodiment of the present disclosure; and FIG. 7 is a top view of the camera module according to the third embodiment of the present disclosure along an optical axis direction. It can be seen from the figures that the camera module according to the present disclosure comprises: an imaging module 12", a sleeve module 20", a lens module 30" which is disposed in the sleeve module 20" and can move along an optical axis direction relative to the sleeve module 20 (First Embodiment can be referred to here, but in this embodiment, the lens module 30" is not provided with the friction component), at least one coil 7" (one coil in this embodiment), at least one magnetic component 4" (in this embodiment, 2 magnetic components that can be combined and are vertically disposed, but not as a limitation), and elastic components 9" disposed between the lens module 30" and the sleeve module 20", wherein in order that in a static state, no current is required to maintain the static state so as to reduce the power consumption of the whole camera module, in the camera module according to the present disclosure, the elastic components 9" are clipped to the lens module 30", and the elastic components 9" are pressed against electric conductors 13" disposed between the lens module 30" and the sleeve module 20"; the electric conductors 13" and the sleeve module 20" are relatively static relative to each other and fixed with each other directly or indirectly; the deformation of the elastic components 9" perpendicular to the optical axis direction applies a radial positive pressure to the electric conductors 13" for the lens module 30" and the elastic components 9" integrally; and the elastic components 9" generate the frictional force in the optical axis direction on the contact surface of the electric conductors 13" and the elastic components 9" through the positive pressure, and the frictional force can keep the lens module 30" and the elastic components 9" integrally in the static state in the optical axis direction relative to the sleeve module 20".

In this embodiment, a power supply device provides current to the camera module, and it is controlled by a power supply control device (as shown in FIG. 8) of the imaging module to provide current to the coil 7". The coil 7" matches the lens module 30", and the lens module 30" is subject to an electromagnetic force in the optical axis direction. The electromagnetic force acts as a driving force for the lens module 30" to make rectilinear motions along the optical axis direction so as to drive the lens module 30" to move.

Referring to FIG. 6, FIG. 7, FIG. 8, FIG. 9 and FIG. 10 at the same time, FIG. 8 is a schematic diagram of voltage and current signals driven by a voltage source according to the present disclosure; FIG. 9 is a schematic diagram of current and voltage signals driven by a current source according to the present disclosure; and FIG. 10 is a flowchart of a method for controlling the lens cone of the camera module to make a single-step movement according to the present disclosure. Specifically, a driving unit (unlabeled) supplies pulse current to the coil 7" under the control of the power supply control device (unlabeled) so that the lens module 30" implements a non-continuous movement. A ratio of absolute values of the maximum value and the minimum value of the pulse current is at least 1.2, and 2 is employed in this embodiment. A single pulse width of the pulse current is less than 2 s, and it is is in this embodiment. At a first timing, the driving unit supplies an initial current to the coil 7" under the control of the power supply control device so that the coil 7" and the magnetic components 4" are relatively static to each other, and through detection of a detecting feedback unit (unlabeled), a value of the voltage divided by the current in the coil 7" keeps a first relationship, i.e. U/I=R. Next, the initial current is gradually increased to cause a relative movement between the coil 7" and the magnetic components 4", which results in a second relationship of the value of the voltage divided by the current in the coil 7", i.e. U/I>R. By detecting a change in the first relationship of the value of the voltage divided by the current in the coil 7", the detecting feedback unit can determine that a relative movement occurs between the coil 7" and the magnetic components 4" and obtain a critical current value that causes the relative movement between the coil 7" and the magnetic components 4". Herein, the movement of the lens module 30" is a relative forward or reverse movement along the optical axis direction relative to the sleeve module 20", together with the elastic components 9", and each of the relative forward or reverse movement has a first movement distance that is determined by the radial positive pressure of the elastic components 9", magnitude, rise rate and waveform width of the pulse current in the coil 7", and a friction coefficient between the elastic components 9" and the electric conductors 13". The first movement distance may be specifically determined by the following distance formula of a single-step movement $$s = \frac{nBLI_w(nBLI_w - f + mg\cos\theta)}{2m(f - mg\cos\theta)}\Delta t^2$$

where n is the number of turns of the coil, B is the magnetic induction intensity, L is the effective length of one-turn of the coil, m is the quality of the moving component, f is the magnitude of the friction, $I_w$ is the driving current, θ is an angle between the movement direction and gravity of the lens cone, and Δt is pulse width of a square wave.

Changing one or more of the above parameters can change the first movement distance to control the movement of the lens module 30.

As shown in FIG. 6 and FIG. 7, the lens module 30" further includes a motion carrier seat 6", a lens cone (located within the motion carrier seat, unlabeled).

The lens cone is disposed within the motion carrier seat 6", and the motion carrier seat 6" and the lens cone may be integrally or separately modeled. The motion carrier seat 6" is provided with several extension parts 61" that are radially divergent; and the coil 7" is disposed in the extension parts 61" and is adapted to move together with the lens module 30". In addition, this embodiment may also be the same as the first embodiment in that the corresponding sleeve module 20" further includes a magnetic yoke ring 2" and a sleeve unit 1" disposed within the magnetic yoke ring 2", and the sleeve unit 20" stretches out of an outer end surface of the magnetic yoke ring 2" for more than 0.2 mm, which functions to guide the lens module 30" and protect the lens module 30". Moreover, yoke iron blocks 3" may be disposed in the magnetic yoke ring 2", and the yoke iron blocks 3" are of magnetic conductive material and functions to conduct magnetism for the magnetic components 4"; an air gap is between the yoke iron blocks 3" and an internal surface of the magnetic yoke ring 2"; the coil 7" is disposed in the air gap and can move along the optical axis direction, and length of the air gap in the optical axis direction occupies more than one third of the total thickness of the camera module in the optical axis direction. Herein, the magnetic yoke ring 2", the sleeve unit 1" and the yoke iron blocks 3" of the sleeve module 20" are integrally or separately modeled.

The coil 7" is connected to a first conductive part (unlabeled) of the lens module 30"; the first conductive part is in contact with the elastic components 9"; the elastic components 9" are in contact with a power supply terminal and are adapted to be powered by the power supply device; and the elastic components 9" are conductive or each has a second conductive part so that the power supply terminal can provide current to the coil 7" through the elastic components 9" or the conductive part of elastic component 9". The coil 7" includes two fixed structures. In a first fixed structure, the coil 7" is directly and fixedly connected to the extension parts 61". In a second fixed structure, the coil 7" is at a relative movement distance from the extension parts 61" in the optical axis direction, and the relative movement distance is between 10 μm and 1 mm. The power supply control device transmits a control signal to the driving unit to further provide a driving signal corresponding to the coil 7" of the camera module. In the first fixed structure, there are two driving modes for the current. In a first driving mode, current in consistent with the relative forward direction is supplied to the coil 7" to directly drive the lens module 30" to move; and in a second driving mode, current in consistent with the relative reverse direction is supplied to the coil 7" so that the lens module 30" stores certain elastic potential energy, and then current in consistent with the relative forward direction is supplied to drive the lens module 30" to move and to rest under the friction force.

In the second fixed structure, the driving mode of the current is: supplying current in consistent with the relative reverse direction to the coil 7" so that the coil 7" stores certain elastic potential energy, and then supplying current in consistent with the relative forward direction so that the electromagnetic force does positive work and the coil 7" accumulates kinetic energy and collides with the lens module 30" to drive the lens module 30" to move and to rest under the friction force. In addition, the camera module is further provided with a base 10". The base 10" is disposed on the imaging module 12" to limit the moving positions of the lens module 30" along the optical axis direction. The camera module may further include an infrared filter that is laid on the photosensitive surface of the image sensor of the imaging module 12".

Referring to the structures in the first embodiment, the second embodiment and the third embodiment, in the initial optical state, the lens modules 30, 30', 30" all have two optical focusing states, i.e.

a first state: the lens modules 30, 30', 30" being initially in a state of focusing on an object at infinity for directly imaging;

a second state: the lens modules 30, 30', 30" being initially in a state of not focusing on an object at infinity for directly imaging. In this case, the lens modules 30, 30', 30" is adjusted to the state of focusing on the object at infinity for imaging by being supplied with current through the coils 7, 7', 7" and stretching the lens modules 30, 30', 30" out of the sleeve module 20'. When in the second state, the time for the lens modules 30, 30', 30" to finish stretching out of the end surfaces of the sleeve modules 20, 20', 20" or retracting into the sleeve modules 20, 20', 20" is smaller than 20 s. When in the first state or the second state, the lens modules 30, 30', 30" move discontinuously, and the distance for each continuous movement is not more than 100 μm to implement a function of searching for a focusing position. When the lens modules 30, 30', 30" move relative to the sleeve modules 20, 20', 20", images are output through the imaging modules 12, 12', 12" and the clarity of the images is detected to determine and match the first state or the second state based on a change of the clarity of the images to implement the stretching and/or focusing function of the lens modules 30, 30', 30".

In the first embodiment, the second embodiment and the third embodiment, FIG. 8 and FIG. 9 respectively show two different schematic diagrams, in which a voltage source and a current source are employed respectively. Ignoring the inductance of the coils 7, 7', 7", the relationship between the voltage across the coils 7, 7', 7" and the current therein is $U=RI+nBLv$, where U is the voltage across the coils 7, 7', 7"; R is the resistance of the coils 7, 7', 7"; I is the current in the coils 7, 7', 7"; n is the number of turns of the coil; B is the magnetic induction intensity; L is the effective length of one-turn of the coils 7, 7', 7"; and v is the movement velocity of the coils 7, 7', 7".

It can be learned from the formula that as shown in FIG. 8, when the voltage source is employed, the voltage U is constant; a. when the coils 7, 7', 7" move, according to the principle of mechanics, the movement velocity will increase first and then keep constant, and thus the current I in the coils 7, 7', 7" will decrease first and then keep constant; and b. when the coils 7, 7', 7" do not move, the current I in the coils 7, 7', 7" will keep constant.

However, as shown in FIG. 9, when the current source is employed, the current I is constant; a. when the coils 7, 7', 7" move, with the increase of the movement velocity, the voltage U across the coils 7, 7', 7" will increase gradually; and b. when the coils do not move, the voltage U across the coils 7, 7', 7" will keep constant. Thereby, the movement of the lens module 30 or 30' can be controlled.

FIG. 10 is a flowchart of a method for controlling the lens cone of the camera module to make a single-step movement according to the present disclosure. Referring to FIG. 8 and FIG. 9 at the same time, during the movement of the lens cone, the detecting feedback unit detects the change in the value of the voltage divided by the current in the coils 7, 7', 7", caused by movement of the lens modules 30, 30', 30", and transmits the related detection information to the power supply control device so that the power supply control device can obtain, according to the change of the value, a critical current that causes relative movement of the lens modules 30, 30', 30" and provides a corresponding control signal to the driving unit. The driving unit provides a driving signal to the camera module to control the lens modules 30, 30', 30" in the camera module to respectively move in the optical axis direction synchronized with the coils 7, 7" in the first embodiment and third embodiment, or to move in the optical axis direction synchronized with the magnetic components 4' in the second embodiment, and to cause, via continuous detection feedback, control calculation and driving, the lens modules 30, 30', 30" to make a relative forward or reverse movement in the sleeve modules 20, 20', 20".

Specifically, based on the change in the value of the voltage divided by the current, the power supply control device supplies corresponding pulse current to the coils 7, 7', 7" such that the electromagnetic force driving the lens modules 30, 30', 30" may overcome the resistance such as the friction force, etc. to drive the lens cone to slide relative to the contact surface of the elastic components 9, 9', 9" and then stop at a certain position under the kinetic friction force, that is, the lens module 30 or 30' achieves a step forward.

Preferably, a step forward of the lens modules 30, 30', 30" means that the lens modules 30, 30', 30" slide a certain distance relative to the contact surface of the elastic components 9, 9', 9". Alternatively, the lens modules 30, 30', 30" and the elastic components 9, 9', 9" are integrated. In this case, the elastic components 9, 9', 9" and the lens modules 30, 30', 30" slide a certain distance relative to the sleeve modules 20, 20', 20", and the distance is determined by factors such as the radial elastic force, axial stiffness, electromagnetic force and friction coefficient of the elastic components 9, 9', 9". The distance of each step forward is not more than 100 μm and has repeatability. Therefore, repeating the above step forward process can control the positions of the lens modules 30, 30', 30" and implement the stretching and/or focusing function of the camera module.

During the step forward process of the lens modules 30, 30', 30", the lens modules 30, 30', 30" become stationary relative to the module from movement, and enables each step forward via the control of the electromagnetic driver force, that is, the lens modules 30, 30', 30" slide a certain distance relative to the contact surface of the elastic components 9, 9', 9".

By means of the control method and the camera module according to the present disclosure, an optimal control of the camera can be achieved so that such a new kind of camera module can make the lens modules 30, 30', 30" stretch out of the module, and increases the size of the light-sensitive chip on the condition of ensuring a constant viewing angle to improve the image quality. Meanwhile, its structure is simple and can be applied to the thin and light electronic device such as a mobile phone, a pad, etc. Besides, no additional current is needed when the lens modules 30, 30', 30" are static, thereby saving the power consumption of the camera module, which is especially important for a portable device.

Although the present disclosure is illustrated and described in detail in the appended drawings and the foregoing description, it should be considered that such illustration and description is illustrative and exemplary, rather than restrictive, and the present disclosure is not limited to the above embodiments.

Those ordinarily skilled in the art can understand and implement other changes of the disclosed embodiments through studying the description, the disclosure and the appended drawings and the appended claims. In practical applications of the disclosure, a part may perform functions of multiple technical features recited in the claims. In the claims, the wording "comprising" does not exclude other elements and steps, and the wording "a" or "an" does not exclude a plurality. Any reference labels in the appended drawings in the claims shall not be construed as limiting the scope.

The invention claimed is:

1. A method for controlling a camera module, wherein the camera module comprises an imaging module, a sleeve module, a lens module which is mounted in the sleeve module and can move along an optical axis direction relative to the sleeve module, at least one coil, at least one magnetic component, and elastic components disposed between the lens module and the sleeve module, the control method comprising steps of:
   (a1) pressing the elastic components against the lens module, wherein deformation of the elastic components perpendicular to the optical axis direction applies a radial positive pressure to the lens module, a frictional force in the optical axis direction is generated by the positive pressure on a contact surface of the elastic components and the lens module so that the frictional force can keep the lens module in a static state in the optical axis direction relative to the elastic components, or
   (a2) fixedly connecting the elastic components to the lens module, wherein the elastic components are pressed against electric conductors disposed between the lens module and the sleeve module, the electric conductors and the sleeve module are static relative to each other and fixed with each other directly or indirectly; a deformation of the elastic components perpendicular to the optical axis direction applies a radial positive pressure to the electric conductors for the lens module and the elastic components integrally, a frictional force in the optical axis direction is generated by the positive pressure on the contact surface of the electric conductors and the elastic components so that the frictional force can keep the lens module and the elastic components integrally in the static state in the optical axis direction relative to the sleeve module; and
   (b) supplying current to the at least one coil, wherein the at least one coil or the at least one magnetic component optionally matches the lens module, and the lens module is subject to an electromagnetic force in the optical axis direction, the electromagnetic force acting as a driving force for the lens module to do rectilinear motion along the optical axis direction so as to drive the lens module to move; and
   wherein in step (b):
      the current supplied to the at least one coil is pulse current so that the lens module implements a non-continuous movement;
      a ratio of absolute values of a maximum value and a minimum value of the pulse current is at least 1.2; and
      a single pulse width of the pulse current is less than 2 s.

2. The method according to claim 1, characterized in that in the step b (b), an initial current is supplied to the at least one coil so that the at least one coil and the at least one magnetic component are static relative to each other, and a value of a voltage (U) divided by the current (I) in the at least one coil keeps a first relationship of U/I=R, where R is a resistance of the at least one coil.

3. The method according to claim 2, characterized in that the method further comprising:
   gradually increasing the initial current to cause a relative movement between the at least one coil and the at least one magnetic component, which results in the value of the voltage (U) divided by the current (I) in the at least one coil to be a second relationship of U/I>R; and
   detecting a change in the first relationship of the value of a voltage (U) divided by the current (I) in the at least one coil to determine that the relative movement occurs between the at least one coil and the at least one magnetic component.

4. The method according to claim 1, characterized in that in the step (b), the movement of the lens module is a relative forward or reverse movement along the optical axis direction relative to the elastic components, wherein each of the relative forward or reverse movement is of a first movement distance that is determined by the radial positive pressure of the elastic components, magnitude, rise rate and waveform width of the pulse current in the at least one coil, and a friction coefficient between the lens module and the elastic components; and changing one or more of above parameters can change the first movement distance to control the movement of the lens module.

5. The method according to claim 1, characterized in that in the step (b), the movement of the lens module is a relative forward or reverse movement along the optical axis direction relative to the sleeve module, wherein each of the relative forward or reverse movement is of a first movement distance that is determined by the radial positive pressure of the elastic components, magnitude, rise rate and waveform width of the pulse current in the at least one coil, and a friction coefficient between the electric conductors and the elastic components; and changing one or more of above parameters can change the first movement distance to control the movement of the lens module and the elastic components.

6. The method according to claim 1, characterized in that the lens module further includes a motion carrier seat, a lens cone and a friction component, wherein the lens cone is disposed in the motion carrier seat, and the motion carrier seat and the lens cone are integrally or separately modeled; the motion carrier seat has several extension parts that are radially divergent; the at least one coil is disposed in the extension parts and is adapted to move together with the lens module; and the friction component is disposed between the extension parts and the elastic components.

7. The method according to claim 6, characterized in that the sleeve module includes a magnetic yoke ring and a sleeve unit disposed within the magnetic yoke ring, and the sleeve unit stretches out of an outer end surface of the magnetic yoke ring for more than 0.2 mm, which functions to guide the lens module and protect the lens module.

8. The method according to claim 7, characterized in that yoke iron blocks are disposed in the magnetic yoke ring; an air gap is between the yoke iron blocks and an internal surface of the magnetic yoke ring; the at least one coil is disposed in the air gap and can move along the optical axis direction; and length of the air gap in the optical axis direction occupies more than one third of a total thickness of the camera module in the optical axis direction.

9. The method according to claim 7, characterized in that the magnetic yoke ring, the sleeve unit and the yoke iron blocks of the sleeve module are integrally or separately modeled.

10. The method according to claim 6, characterized in that the at least one coil includes two fixed structures;

in a first fixed structure, the at least one coil is directly and fixedly connected to the extension parts; and in a second fixed structure, the at least one coil is at a relative movement distance from the extension parts in the optical axis direction, and the relative movement distance is between 10 μm and 1 mm.

11. The method according to claim 10, characterized in that in the first fixed structure, there are two driving modes for the current, wherein in a first driving mode, current in consistent with the relative forward direction is supplied to the at least one coil to directly drive the lens module to move; and in a second driving mode, current in consistent with the relative reverse direction is supplied to the at least one coil so that the lens module stores certain elastic potential energy, and then current in consistent with the relative forward direction is supplied to drive the lens module to move and to rest under the friction force.

12. The method according to claim 10, characterized in that in the second fixed structure, the driving mode for the current is:

supplying current consistent with the relative reverse direction to the at least one coil so that the at least one coil stores certain elastic potential energy, and then supplying current consistent with the relative forward direction so that the electromagnetic force does positive work and the at least one coil accumulates kinetic energy and collides with the lens module to drive the lens module to move and to rest under the friction force.

13. The method according to claim 1, characterized in that the lens module further includes a motion carrier seat and a lens cone, wherein the lens cone is disposed in the motion carrier seat, and the motion carrier seat and the lens cone are integrally or separately modeled; the motion carrier seat has several extension parts that are radially divergent; the at least one coil is disposed in the extension parts and is adapted to move together with the lens module; and the elastic components are connected to the extension parts or external of the coil so that the elastic components can move together with the lens module.

14. The method according to claim 1, characterized in that the at least one coil is connected to a conductive part of the lens module; the conductive part is in contact with the elastic components; the elastic components are in contact with a power supply terminal; and the elastic components are conductive or each has a conductive part so that the power supply terminal can provide current to the at least one coil through the elastic components or the conductive part of the elastic component.

15. The method according to claim 1, characterized in that the electric conductors are in contact with a power supply terminal, and the elastic components are conductive or each has a conductive part; and the at least one coil is in contact with and connected to the elastic components so that the power supply terminal can provide current to the at least one coil through the electric conductors and then through the elastic components.

16. The method according to claim 1, characterized in that
the lens module further includes a motion carrier seat, a lens cone and a friction component, wherein the lens cone is disposed in the motion carrier seat, and the motion carrier seat and the lens cone are integrally or separately modeled;

external surface of the motion carrier seat is provided with the magnetic component and is adapted to move together with the lens module;

the at least one coil is disposed at a position of the sleeve module corresponding to the magnetic component;

the elastic components are disposed between the sleeve module and the lens module; and the friction component is disposed between the motion carrier seat and the at least one elastic component.

17. The method according to claim 16, characterized in that the sleeve module includes a base and a sleeve unit disposed within the base, wherein the sleeve unit stretches out of an outer end surface of the base for more than 0.2 mm, which functions to guide the lens module and protect the lens module.

18. The method according to claim 16, characterized in that the at least one coil is directly in contact with a power supply terminal, and the supply terminal provides current to the at least one coil.

19. The method according to claim 16, characterized in that the magnetic component includes two fixed structures;
in a first fixed structure, the at least one magnetic component is directly and fixedly connected to the extension parts; and
in a second fixed structure, the at least one magnetic component is at a relative movement distance from the motion carrier seat along the optical axis direction, and the relative movement distance is between 10 μm and 1 mm.

20. The method according to claim 19, characterized in that in the first fixed structure, there are two driving modes for the current,
wherein in a first driving mode, current in consistent with the relative forward direction is supplied to the at least one coil so that the magnetic component directly drives the lens module to move; and
in a second driving mode, current in consistent with the relative reverse direction is supplied to the at least one coil so that the lens module stores certain elastic potential energy, and then current in consistent with the relative forward direction is supplied so that the magnetic component drives the lens module to move and to rest under the friction force.

21. The method according to claim 19, characterized in that in the second fixed structure, the driving mode for the current is:
firstly supplying current consistent with the relative reverse direction to the at least one coil so that the at least one magnetic component stores certain elastic potential energy, and
then supplying current consistent with the relative forward direction so that the electromagnetic force does positive work and the at least one magnetic component accumulates kinetic energy and collides with the lens module to drive the lens module to move and to rest under the friction force.

22. The method according to claim 1, characterized in that the lens module can have two structure states in the steps (a1) and (a2),
wherein in a first state, the lens module is initially in a state of focusing on an object at infinity for directly imaging; and
in a second state, the lens module is initially in a state of not focusing on an object at infinity for directly imaging; the lens module is adjusted to the state of focusing on the object at infinity for imaging by supplying current through the coil, and stretching the lens module out of the sleeve module.

23. The method according to claim 22, characterized in that when in the second state, time for the lens module to finish stretching out of an end surface of the sleeve module or retracting into the sleeve module is smaller than 20 s.

24. The method according to claim 23, characterized in that when in the first state or the second state, the lens module moves discontinuously, and a distance for each continuous movement is not more than 100 μm so as to implement a function of searching for a focusing position.

25. The method according to claim 23, characterized in that when the lens module moves relative to the sleeve module, an image is output through the imaging module and clarity of the image is detected, and the first state or the second state is determined and matched based on a change of the clarity of the image to implement the stretching and/or focusing function of the lens module.

26. A camera module comprising an imaging module, a sleeve module, a lens module which is mounted in the sleeve module and can move along an optical axis direction relative to the sleeve module, at least one coil, at least one magnetic component, and elastic components disposed between the lens module and the sleeve module, characterized in that:
the elastic components are pressed against the lens module, wherein deformation of the elastic components perpendicular to the optical axis direction applies a radial positive pressure to the lens module, a frictional force in the optical axis direction is generated by the positive pressure on a contact surface of the elastic components and the lens module so that the frictional force can keep the lens module in a static state in the optical axis direction relative to the elastic components, or
the elastic components are fixedly connected to the lens module, wherein the elastic components are pressed against electric conductors; the electric conductors and the sleeve module are static relative to each other and fixed with each other directly or indirectly; a deformation of the elastic components perpendicular to the optical axis direction applies a radial positive pressure to the electric conductors; a frictional force in the optical axis direction is generated by the positive pressure on the contact surface of the elastic components and the electric conductors so that the frictional force can keep the lens module and the elastic components integrally in the static state in the optical axis direction relative to the sleeve module;
the camera module further comprises a power supply control device which supplies current for the at least one coil, wherein the at least one coil or the at least one magnetic component optionally matches the lens module, and the lens module is subject to an electromagnetic force in the optical axis direction, the electromagnetic force acting as a driving force for the lens module to do rectilinear motion along the optical axis direction so as to drive the lens module to move;
wherein the current supplied by the power supply control device to the at least one coil is pulse current so that the lens module implements a non-continuous movement;
a ratio of absolute values of a maximum value and a minimum value of the pulse current is at least 1.2; and
a single pulse width of the pulse current is less than 2 s.

27. The camera module according to claim 26, characterized in that the power supply control device supplies an initial current to the at least one coil so that the at least one coil and the at least one magnetic component are static relative to each other, and a value of a voltage (U) divided by the current (I) in the at least one coil keeps a first relationship of U/I=R, wherein (R) is a resistance of the at least one coil.

28. The camera module according to claim 27, characterized in that the initial current is gradually increased to cause a relative movement between the at least one coil and the at least one magnetic component, which results in the value of the voltage (U) divided by the current (I) in the at least one coil to be a second relationship of U/I>R; and a change in the first relationship of the value of a voltage (U) divided by the current (I) in the at least one coil is determined to determine that the relative movement occurs between the at least one coil and the at least one magnetic component.

29. The camera module according to claim 26, characterized in that the movement of the lens module is a relative forward or reverse movement along the optical axis direction relative to the elastic components, wherein each of the relative forward or reverse movement is of a first movement distance that is determined by the radial positive pressure of the elastic components, magnitude, rise rate and waveform width of the pulse current in the at least one coil, and a friction coefficient between the lens module and the elastic components; and changing one or more of above parameters can change the first movement distance to control the movement of the lens module.

30. The camera module according to claim 26, characterized in that the movement of the lens module is a relative forward or reverse movement along the optical axis direction relative to the sleeve module integrally with the elastic components, wherein each of the relative forward or reverse movement is of a first movement distance that is determined by the radial positive pressure of the elastic components, magnitude, rise rate and waveform width of the pulse current in the at least one coil, and a friction coefficient between the electric conductors and the elastic components; and changing one or more of above parameters can change the first movement distance to control the movement of the lens module.

31. The camera module according to claim 26, characterized in that
the lens module further includes a motion carrier seat, a lens cone and a friction component, wherein the lens cone is disposed in the motion carrier seat, and the motion carrier seat and the lens cone can be integral;
the motion carrier seat has several extension parts that are radially divergent; the at least one coil is disposed in the extension parts and is adapted to move together with the lens module; and
the friction component is disposed between the extension parts and the elastic components.

32. The camera module according to claim 31, characterized in that the sleeve module includes a magnetic yoke ring and a sleeve unit disposed within the magnetic yoke ring, and the sleeve unit stretches out of an outer end surface of the magnetic yoke ring for more than 0.2 mm, which functions to guide the lens module and protect the lens module.

33. The camera module according to claim 32, characterized in that
yoke iron blocks are disposed in the magnetic yoke ring;
an air gap is between the yoke iron blocks and an internal surface of the magnetic yoke ring;
the at least one coil is disposed in the air gap and can move along the optical axis direction; and
length of the air gap in the optical axis direction occupies more than one third of a total thickness of the camera module in the optical axis direction.

34. The camera module according to claim 31, characterized in that the at least one coil includes two fixed structures;
in a first fixed structure, the at least one coil is directly and fixedly connected to the extension parts; and
in a second fixed structure, the at least one coil is at a relative movement distance from the extension parts in the optical axis direction, and the relative movement distance is between 10 μm and 1 mm.

35. The camera module according to claim 34, characterized in that in the second fixed structure, the driving mode for the current is:
supplying current consistent with the relative reverse direction to the at least one coil so that the at least one coil stores certain elastic potential energy, and then supplying current consistent with the relative forward direction so that the electromagnetic force does positive work and the at least one coil accumulates kinetic energy and collides with the lens module to drive the lens module to move and to rest under the friction force.

36. The camera module according to claim 26, characterized in that
the lens module further includes a motion carrier seat and a lens cone, wherein the lens cone is disposed in the motion carrier seat, and the motion carrier seat and the lens cone are integrally or separately modeled;
the motion carrier seat has several extension parts that are radially divergent; the at least one coil is disposed in the extension parts and is adapted to move together with the lens module; and
the elastic components are connected to the extension parts or external of the coil so that the elastic components can move together with the lens module.

37. The camera module according to claim 26, characterized in that
the at least one coil is connected to a conductive part of the lens module;
the conductive part is in contact with the elastic components;
the elastic components are in contact with a power supply terminal; and
the elastic components are conductive or each has a conductive part so that the power supply terminal can provide current to the at least one coil through the elastic components or the conductive part of the elastic component.

38. The camera module according to claim 26, characterized in that
the electric conductors are in contact with a power supply terminal, and the elastic components are conductive or each has a conductive part; and
the at least one coil is in contact with and connected to the elastic components so that the power supply terminal can provide current to the at least one coil through the electric conductors and then through the elastic components.

39. The camera module according to claim 38, characterized in that in the first fixed structure, there are two driving modes for the current,
wherein in a first driving mode, current in consistent with the relative forward direction is supplied to the at least one coil to directly drive the lens module to move; and
in a second driving mode, current in consistent with the relative reverse direction is supplied to the at least one coil so that the lens module stores certain elastic potential energy, and then current in consistent with the relative forward direction is supplied to drive the lens module to move and to rest under the friction force.

40. The camera module according to claim 26, characterized in that the lens module further includes a motion carrier seat, a lens cone and a friction component,
wherein the lens cone is disposed in the motion carrier seat, and the motion carrier seat and the lens cone can be integral;
external surface of the motion carrier seat is provided with the magnetic component and is adapted to move together with the lens module;
the at least one coil is disposed at a position of the sleeve module corresponding to the magnetic component; the elastic components are disposed at positions inside the sleeve module that is not corresponding to the at least one magnetic component; and the friction component is disposed between the motion carrier seat and the at least one elastic component.

41. The camera module according to claim 40, characterized in that the magnetic component includes two fixed structures; in a first fixed structure, the at least one magnetic component is directly and fixedly connected to the extension parts; and in a second fixed structure, the at least one magnetic component is at a relative movement distance from the motion carrier seat along the optical axis direction, and the relative movement distance is between 10 μm and 1 mm.

42. The camera module according to claim 41, characterized in that in the first fixed structure, there are two driving modes for the current, wherein in a first driving mode, current in consistent with the relative forward direction is supplied to the at least one coil so that the magnetic component directly drives the lens module to move; and in a second driving mode, current in consistent with the relative reverse direction is supplied to the at least one coil so that the lens module stores certain elastic potential energy, and then current in consistent with the relative forward direction is supplied so that the magnetic component drives the lens module to move and to rest under the friction force.

43. The camera module according to claim 40, characterized in that in the second fixed structure, the driving mode for the current is:

firstly supplying current consistent with the relative reverse direction to the at least one coil so that the at least one magnetic component stores certain elastic potential energy, and then supplying current consistent with the relative forward direction so that the electromagnetic force does positive work and the at least one magnetic component accumulates kinetic energy and collides with the lens module to drive the lens module to move and to rest under the friction force.

44. The camera module according to claim 26, characterized in that the lens module may have two structure states, wherein in a first state, the lens module is initially in a state of focusing on an object at infinity for directly imaging;

in a second state, the lens module is initially in a state of not focusing on an object at infinity for directly imaging; and the lens module is adjusted to the state of focusing on the object at infinity for imaging by supplying current through the coil, and stretching the lens module out of the sleeve module.

* * * * *